(12) United States Patent
Gaggl

(10) Patent No.: US 12,397,992 B2
(45) Date of Patent: Aug. 26, 2025

(54) STORAGE AND PICKING SYSTEM AND METHOD FOR PREDICTING AND/OR AVERTING A FUTURE DISRUPTION

(71) Applicant: TGW Logistics GmbH, Marchtrenk (AT)

(72) Inventor: Markus Gaggl, Ansfelden (AT)

(73) Assignee: TGW Logistics GmbH, Marchtrenk (AT)

( * ) Notice: Subject to any disclaimer, the term of this patent is extended or adjusted under 35 U.S.C. 154(b) by 618 days.

(21) Appl. No.: 17/783,296

(22) PCT Filed: Dec. 7, 2020

(86) PCT No.: PCT/AT2020/060436
§ 371 (c)(1),
(2) Date: Jun. 8, 2022

(87) PCT Pub. No.: WO2021/113886
PCT Pub. Date: Jun. 17, 2021

(65) Prior Publication Data
US 2023/0013246 A1 Jan. 19, 2023

(30) Foreign Application Priority Data
Dec. 13, 2019 (AT) .............................. A 51089/2019

(51) Int. Cl.
*B65G 1/137* (2006.01)
*B65G 43/02* (2006.01)
*B65G 43/08* (2006.01)

(52) U.S. Cl.
CPC ........... *B65G 1/1371* (2013.01); *B65G 43/02* (2013.01); *B65G 43/08* (2013.01)

(58) Field of Classification Search
CPC ....... B65G 1/1371; B65G 43/02; B65G 43/08
See application file for complete search history.

(56) References Cited

U.S. PATENT DOCUMENTS 7,844,398 B2 * 11/2010 Sato ........................ B25J 9/1666
700/214
9,459,620 B1   10/2016 Schaffalitzky
(Continued)

FOREIGN PATENT DOCUMENTS

EP    3 147 841 A1   3/2017
WO    2020/086995 A1   4/2020

OTHER PUBLICATIONS

International Search Report in PCT/AT2020/060436, mailed Mar. 25, 2021.

*Primary Examiner* — Kyle O Logan
(74) *Attorney, Agent, or Firm* — Collard & Roe, P.C.

(57) ABSTRACT

A method in which a probability of the occurrence of a disruption is issued and/or a measure is initiated which reduces the probability of the occurrence of this disruption if the occurrence of a disruption is probable bases the probability on unit load properties of a conveyed unit load. In this method, the transport of this unit load is classified with regard to whether or not a disruption occurs during the transport of this unit load. The unit load properties are fed into a learning algorithm together with the transport classification. By repeating the steps for a number of unit loads, the probability of the occurrence of a disruption during the transport of the unit loads can be computed. Further, a picking system carries out the method presented.

25 Claims, 4 Drawing Sheets

(56) References Cited

U.S. PATENT DOCUMENTS

| | | | |
|---|---|---|---|
| 10,402,774 B1* | 9/2019 | Phillips | G06N 20/00 |
| 2008/0133051 A1* | 6/2008 | Wallace | G05B 23/0232 |
| | | | 198/810.01 |
| 2017/0023947 A1 | 1/2017 | McMillion | |
| 2017/0091706 A1 | 3/2017 | Lloyd et al. | |
| 2018/0224837 A1* | 8/2018 | Enssle | G06Q 10/0875 |
| 2020/0130935 A1* | 4/2020 | Wagner | G05B 19/41 |

* cited by examiner

STORAGE AND PICKING SYSTEM AND METHOD FOR PREDICTING AND/OR AVERTING A FUTURE DISRUPTION

CROSS REFERENCE TO RELATED APPLICATIONS

This application is the National Stage of PCT/AT2020/060436 filed on Dec. 7, 2020, which claims priority under 35 U.S.C. § 119 of Austrian Application No. A 51089/2019 filed on Dec. 13, 2019, the disclosure of which is incorporated by reference. The international application under PCT article 21 (2) was not published in English.

BACKGROUND OF THE INVENTION

1. Field of the Invention

A method for operating a picking system (storage and picking system) is specified in which unit load properties of a unit load to be transported with a conveying system of the picking system are determined using a unit load measurement device of the picking system, the determined unit load properties are stored in a data memory assigned to the unit load and the unit load is transported using the conveying system of the picking system.

Further, a picking system (storage and picking system) is specified which comprises a conveying system for transporting a unit load, a unit load measurement device for determining unit load properties of the unit load, as well as a writing device for storing the unit load properties of the unit load in a data memory assigned to the unit load and a reading device for reading out the properties of the unit load from the data memory or a combined writing and reading device for storing the properties of the unit load in a data memory assigned to the unit load and for reading out the properties of the unit load from the data memory.

2. Description of the Related Art

A method and a picking system as described above are generally known from the prior art. In this method and picking system, unit load properties such as its dimensions are acquired and stored for later use.

Also known are in particular methods and picking systems in which the deviation of the unit load from a cuboid shape is determined by a unit load measurement device and the unit load measurement device, or an evaluation unit connected thereto, performs a classification concerning the conveyance properties, for example: "not conveyable," "conveyable," "difficult to convey," "easy to convey." Subsequently, measures are taken, for example in order to render conveyable unit loads which are not conveyable or difficult to convey, for example by repacking articles.

The known methods and picking systems are disadvantageous in that the classification is done according to a more or less rigid scheme and unknown interference effects on the conveying system (based on an interaction between the conveying system and the unit load) which have a disadvantageous effect on the conveyance of the unit loads are not taken into account.

SUMMARY OF THE INVENTION

It is therefore an object of the invention to specify an improved method for operating a picking system as well as an improved picking system. In particular, unknown interference effects on the conveying system which have a disadvantageous effect on the conveyance of the unit loads are to be taken into account.

The object of the invention is achieved with a method for predicting and/or averting a future disruption in a picking system, comprising the steps:
a) determining, with a unit load measurement device of the picking system, unit load properties of a unit load to be transported with a conveying system of the picking system,
b) issuing, with an output unit of the picking system, a probability of the occurrence of a disruption (i e making a prediction of the occurrence of a disruption) and/or initiating, with a control of the picking system, a measure which reduces the probability of the occurrence of this disruption if the occurrence of a disruption is probable, wherein the probability is based on the respective unit load properties of the conveyed unit load,
c) storing the determined unit load properties in a data memory assigned to the unit load,
d) transporting the unit load with the conveying system of the picking system,
e) classifying the transport of this unit load as disrupted by a monitoring and classification unit of the picking system if a disruption is detected by the monitoring and classification unit during the transport of this unit load or classifying the transport as disruption-free if no disruption is detected by the monitoring and classification unit during the transport of this unit load within a specifiable observation period,
f) feeding the stored properties of the unit load and the transport classification of the transport of the unit load determined in step e) into a learning algorithm and
g) repeating steps a) to f) for a plurality of unit loads and computing, with the learning algorithm, a probability of the occurrence of a disruption during the transport of the various unit loads (in short: "disruption probability") for which steps a) to f) are run through, depending on their unit load properties.

The object of the invention is also achieved with a picking system comprising
a conveying system for transporting a unit load,
a unit load measurement device for determining unit load properties of the unit load,
a writing device for storing the properties of the unit load in a data memory assigned to the unit load and a reading device for reading out the properties of the unit load from the data memory or a combined writing and reading device for storing the properties of the unit load in a data memory assigned to the unit load and for reading out the properties of the unit load from the data memory,
an output unit for issuing a probability of the occurrence of a disruption (i.e. making a prediction of the occurrence of a disruption) based on the determined properties of the unit load and/or a control for initiating a measure which reduces the probability of the occurrence of this disruption if the occurrence of a disruption is probable, based on the determined properties of the unit load,
a monitoring and classification unit configured to detect a disruption during the transport of the unit load and to classify the transport of the unit load as disrupted or to classify the transport as disruption-free if no disruption was detected by the monitoring and classification unit during the transport of this unit load within a specifiable observation period, and a learning algorithm, into which stored properties of the unit load and a transport classification of the transport of the unit load can be fed and which is configured to compute a probability of the occurrence of a disruption during the transport of various unit loads (in short: "disruption probability"), depending on their unit load properties.

The proposed measures ensure that disruptions which are caused by a unit load on the conveying system of the picking system are attributed and/or assigned to its unit load properties. Collecting the respective information for a plurality of unit loads enables a "pattern" for the occurrence of disruptions to be identified (provided that such a pattern exists). As soon as this knowledge from experience has been gathered, disruptions can be predicted and a probability of their occurrence can be determined and displayed. Also counter-measures can be initiated in order to avoid the actual occurrence of the predicted disruption. In this manner, in particular negative influences on the picking system by specific unit loads which were not or could not be taken into account during the planning stage of the picking system can be identified retrospectively.

A "learning algorithm" generates knowledge from experience and, to that end, learns on the basis of examples and, after concluding the learning phase, is able to generalize these. During the learning phase, the learning algorithm builds a statistical model which is based on training data. Examples of learning algorithms are, for example, artificial neuronal networks, self-learning decision trees, as well as genetic algorithms. The procedure described is also known by the term "machine learning." Within the scope of the invention, the learning or training phase can be done, in particular in full or in part, during operation of the picking system.

The "probability of the occurrence of a disruption during the transport of a unit load," in short: "disruption probability," specifies in particular how many unit loads from a group of unit loads with identical (or similar) unit load properties produce a disruption. A disruption probability of 10%, therefore, means that 1 in 10 unit loads of this group causes a disruption in the picking system. Looking at an individual unit load, this specification also means that there is 90% probability that no disruption will be caused. In case of 50% disruption probability, there is an even balance of those unit loads which cause a disruption and those unit loads which do not cause a disruption. Even though the specification of the disruption probability on the abovementioned basis is of advantage, it is nevertheless conceivable to specify the disruption probability on a different basis.

Within the scope of the invention, an "unit load" which is conveyed or to be conveyed can be understood to mean, in particular, an individual article, a pack of multiple individual articles or a loading aid in which an article or multiple articles (loose or packed) are received.

A "loading aid" serves to receive article(s). In particular, loading aid can be understood to mean containers, cardboard boxes and suchlike. According to the above definition, a unit load can also be formed by a loading aid.

In a "picking system," articles can, for example, be delivered to and taken over at a article receiving area and then optionally be repacked and stored in an article warehouse. The articles can also be picked in accordance with an order, i.e. be retrieved from the article warehouse, compiled into an order and provisioned for outbound-transporting at the article issue area. As opposed to a manufacturing process, the articles are not substantially changed between the article receiving area and the article issue area. However, a slight change in shape is possible, in particular in case of non-rigid bodies such as pouches or bags, for example, or also in case of other pliant packaging, for instance made of cardboard or plastic.

The "conveying system" of the picking system serves generally the transport of unit loads. Unit loads may in particular comprise loading aids with and without articles and/or articles (transported without loading aids). In particular, the conveying system can be divided into different functional zones, for example a "storage conveying system," which serves to transport articles from the article receiving area to a storage zone, and a "retrieval conveying system," which serves to transport articles from the storage zone to the picking station. The conveying system can further be subdivided, technologically, into a "stationary conveying system" and "conveyor vehicles operated in an automated manner."

A "stationary conveying system" requires permanently-arranged devices for transporting articles. A stationary conveying system is in particular understood to mean roller conveyors, band conveyors, chain conveyors, vertical lifts and suchlike. A stationary conveying system is also understood to mean an overhead conveying device which comprises hanging bags for receiving unit loads (preferably one unit load per hanging bag).

Within the scope of the invention, "conveyor vehicles operated in an automated manner" are understood to mean self-propelled driverless conveyor vehicles and/or autonomous guided vehicles.

A "storage and retrieval unit" is a conveyor vehicle operated in an automated manner which travels on rails and can be configured as a single-level storage and retrieval unit (also referred to as "shuttle") or as a multi-level storage and retrieval unit. Due to the permanently-arranged rails on which a storage and retrieval unit travels, it is counted, within the scope of the invention, among the stationary conveying system.

A picking system may comprise a stationary conveying system and conveyor vehicles operated in an automated manner Steps a) to g) may therefore refer jointly to a stationary conveying system and conveyor vehicles operated in an automated manner, to a stationary conveying system only or to conveyor vehicles operated in an automated manner only.

"Transporting" the unit load with the conveying system of the picking system may in particular comprise the transport operation on the conveying system and the storage and retrieval operation in and from a storage zone. The conveying system may in particular comprise a transport surface which transports the unit load or in particular comprise a transport means (for example a hanging bag) which can receive the unit load in a storage space and transport it with same.

A "unit load measurement device" of the picking system serves to detect properties of a unit load. The properties of the unit load may in particular comprise one or multiple properties from the group: weight of the unit load, dimensions of the unit load, deviation of the unit load from a target shape (in particular cuboid shape), surface quality of the unit load.

The dimensions of the unit load can be understood to mean its length, width, height, surface or volume. The deviation of the unit load from a (cuboid) shape (i.e. a variation of form and/or deformation) can be constituted in particular by a bulge (the actual shape of the unit load protrudes beyond the target shape) or an indentation (the actual shape of the unit load deviates inwardly from the target shape). The bulge/indentation can be specified, for example, by the (maximum) normal distance of the bulge/indentation to the target shape, by an area deviating from the target shape, by a volume enclosed between bulge/indentation and target shape or by a measure which is derived from one of the specified parameters or from a combination of these parameters. For example, the measure can be a (dimensionless) proportion between the area specified above and the surface of the target shape or a (dimensionless) proportion between the volume specified above and the volume of the target shape. The deviation of the unit load from a (cuboid) shape can also contain the position of the deviation on the unit load, for example "at the top," "at the bottom," "on the left," "on the right," "at the front," "at the rear." The surface quality can in particular be a coefficient of friction of the surface of the unit load. Yet the surface quality can also be, for example, a moisture value of the unit load, in particular if this unit load has a hygroscopic surface (and the surface consists, for example, of cardboard or wood).

According to the prior art, the unit load measurement device, or an evaluation unit connected thereto, often performs a classification concerning the conveyance properties, for example, "not conveyable," "conveyable," "difficult to convey," "easy to convey." For the purposes of the present disclosure, these conveyance properties can equally be understood as unit load properties, even though, strictly speaking, they describe the interaction between a unit load and the conveying system. Such a unit load measurement device can in particular be understood to be a unit load measurement device already used in the art, which detects, in particular, the deviation of the unit load from a target shape and derives a conveyance property therefrom.

An "output unit" of the picking system may, in particular, comprise a display and/or a loud-speaker. The probability of the occurrence of a disruption can be, for example, numerically-based (e.g. "disruption probability=30%") or text-based (e.g. "disruption probability is high"). In addition, a recommendation for avoiding a disruption can be issued (e.g. "repacking of the unit load recommended"). Yet the "output unit" is by no means mandatorily required, but it is to be understood as being optional.

A "control" of the picking system serves the control of actors (in particular the control of the conveying system), the processing of measurement values of the picking system and/or the execution of commands which are received from an operator of the picking system. A "control" of the picking system serves, in particular, the handling of a storage process of unit loads as well as a retrieval process for a picking order.

The "data memory" can, for example, be integrated in the control of the picking system. Yet the data memory can also be mounted directly on the unit load or form part of it, for example in the form of an RFID tag on which unit load properties can be stored.

The "monitoring and classification unit" of the picking system serves the monitoring of the transport of a unit load, if it is transported by the conveying system and/or on the conveying system of the picking system, and the detection of a transport classification and may comprise, for example, a computer or a logic circuit as well as cameras, scanners and other sensors connected thereto for monitoring the conveying system. A monitoring and classification unit can in particular also read QR codes, barcodes and/or RFID tags which are affixed to a unit load or to the conveying system. In particular, the monitoring and classification unit may comprise a "mobile data detection unit." QR codes, barcodes and/or RFID tags on a unit load can be used to identify the unit load; QR codes, barcodes and/or RFID tags on the conveying system can be used to identify a location (in particular a disruption location) on the conveying system.

A "transport classification" specifies whether or not the transport of a unit load through the picking system has produced a disruption. In particular, the transport classification can adopt the values "transport disrupted" and "transport not disrupted." Evidently, also a more precise classification of the disruption is conceivable, for example "unit load jammed," "unit load fallen over," "unit load dropped off conveying system" and so on.

The "observation period" is the time span within which the transport of a unit load is monitored and classified by a monitoring and classification unit. In particular, the observation period can be specified explicitly, i.e. by a specific specified time (for example eight hours, two days, three weeks) or determined implicitly by a specified event. Such an event may be the passing of a specific point on the conveying system or the leaving of the conveying system. Accordingly, the transport is classified as disruption-free by the monitoring and classification unit if the unit load passes or leaves the conveying system properly and no disruption is detected by the monitoring and classification unit during the transport of this unit load up to that point in time.

Further advantageous designs and further advancements of the invention result from the sub-claims as well as from the description in combination with the figures.

It is favorable if step b) is executed only after a (specifiable) plurality of running throughs steps a) and c) to f). This measure ensures that the disruption probability on which step b) is based rests on a sufficiently large number of evaluated unit loads. In particular, this measure can be taken if no sufficiently long training or learning phase (for example outside of the operation of the picking system) has taken place prior to step a).

It is particularly advantageous if the unit load is a loading aid loaded with articles and the measure initiated in step b) consists in reloading the articles contained in the loading aid into another loading aid (at a reloading station of the picking system), or initiating such a reloading, and subsequently continuing with step a) or transporting the other loading aid on the conveying system of the picking system without running through steps a) to g). This means that the picking system comprises a reloading station for reloading articles from one loading aid into another loading aid. If the transported unit load is a loading aid loaded with articles, a predicted disruption can be averted by reloading the articles contained in the loading aid into another loading aid for which the occurrence of a disruption is less probable. If the loading aid into which the articles were reloaded can, a priori, be classified as in order, this loading aid can be transported with the conveying system of the picking system without running through steps a) to g). If the proper condition of the loading aid cannot be assumed a priori, step a) can be carried out next. The reloading of the articles from one loading aid onto another can be done manually (and instructed by the control of the picking system) or automatically (based on commands from the control of the picking system) or combined manually and automatically.

It is further advantageous if a disruption location at which a disruption occurs is detected (by the monitoring and classification unit) in step e), fed into the learning algorithm in step f) and taken into account in steps b) and g) in the sense that the disruption probability of the occurrence of a disruption during the transport of the unit loads is specified depending on the unit load properties of a unit load and depending on the disruption location. This ensures that locations in the picking system which are critical for specific classes of unit load properties, i.e. at which disruptions often occur during the transport of these unit loads, can be identified.

In addition, it is particularly advantageous if the measure initiated in step b) consists in transporting the unit load on the conveying system of the picking system whilst bypassing the predicted disruption location, in particular if, or only if, a disruption probability is smaller when bypassing the predicted disruption location. This option presents itself in particular if multiple transport paths are optionally available inside the picking system for the unit load. For example, it may be provided to store the unit load in the storage zone in which disruptions during the storage operation (and optionally also during the retrieval operation) are less, or least, probable. It may also be provided that the unit load is transported to a specific destination via the transport route for which disruptions during the transport are less, or least, probable. It is also conceivable that a picking operation in which the unit load functions as a source loading aid is done manually if a disruption is probable for an alternative automatic picking operation, and vice versa.

It is also particularly advantageous if the unit load is a loading aid loaded with articles and the measure initiated in step b) consists in
  i) transporting the unit load on the conveying system of the picking system whilst bypassing the predicted disruption location if this is possible, or
  ii) reloading the articles contained in the loading aid into another loading aid (at the reloading station of the picking system) and subsequently continuing with step a) or transporting the other loading aid on the conveying system of the picking system without running through steps a) to g) if step i) is not possible.

In this variant, a (time-consuming) reloading operation is avoided where possible, namely whenever a predicted disruption can be averted by transporting the unit load on the conveying system of the picking system whilst bypassing the predicted disruption location. Optionally, step ii) can be executed even if, while step i) would generally be possible, the reduction of the disruption probability achievable with it is small, in particular smaller than the reduction of the disruption probability achievable by step ii).

Furthermore, it is particularly advantageous if the measure initiated in step b) consists in changing an operating parameter of the conveying system at the predicted disruption location, in particular if, or only if, a disruption probability is lower when changing the operating parameter at the predicted disruption location. This option presents itself in particular whenever adjustable operating parameters for the conveying system are available at the predicted disruption location. An "operating parameter" is a control variable for influencing the operation of the conveying system which is adjustable for the conveying system. An "operating parameter" can be understood to mean, for example, a conveyance speed on the conveying system and/or an acceleration on the conveying system. For example, it would be conceivable to reduce a conveyance speed and/or an acceleration at the predicted disruption location during the conveyance of the unit load.

It is also particularly advantageous if the unit load is a loading aid loaded with articles and the measure initiated in step b) consists in
  i) changing an operating parameter of the conveying system at the predicted disruption location if this is possible, or
  ii) reloading the articles contained in the loading aid into another loading aid (at the reloading station of the picking system) and subsequently continuing with step a) or transporting the other loading aid on the conveying system of the picking system without running through steps a) to g) if step i) is not possible.

In this variant, a (time-consuming) reloading operation is avoided, once again, where possible, namely whenever a predicted disruption can be averted by changing an operating parameter of the conveying system at the predicted disruption location. Optionally, step ii) can be executed even if, while step i) would generally be possible, the reduction of the disruption probability achievable with it is small, in particular smaller than the reduction of the disruption probability achievable by step ii).

It is further most advantageous if the unit load is a loading aid loaded with articles and the measure initiated in step b) consists in
  i) transporting the unit load on the conveying system of the picking system whilst bypassing the predicted disruption location if this is possible, or
  ii) changing an operating parameter of the conveying system at the predicted disruption location if this is possible, or
  iii) reloading the articles contained in the loading aid into another loading aid (at the reloading station of the picking system) and subsequently continuing with step a) or transporting the other loading aid on the conveying system of the picking system without running through steps a) to g) if step i) or step ii) is not possible.

In this variant, a (time-consuming) reloading operation is equally avoided where possible, namely whenever a predicted disruption can be averted by transporting the unit load on the conveying system of the picking system whilst bypassing the predicted disruption location or by changing an operating parameter of the conveying system at the predicted disruption location. Optionally, step iii) can be executed even if, while step i) or step ii) would generally be possible, the reduction of the disruption probability achievable with it is small, in particular smaller than the reduction of the disruption probability achievable by steps i) and step ii). For steps i) and ii), a fixed prioritization (i.e. execute step ii) only if step i) is not possible or vice versa) or a prioritization according to the achievable reduction of the disruption probability (i.e. execute the step out of steps i) or ii) for which the largest reduction of the disruption probability is achievable) can be done.

Furthermore, it is advantageous if step f) (and optionally also step e)) is skipped for those unit loads for which the measure initiated in step b) consists in transporting the unit load on the conveying system of the picking system whilst bypassing the predicted disruption location or for which the measure initiated in step b) consists in changing an operating parameter of the conveying system at the predicted disruption location. This prevents the self-learning algorithm from wrongly assuming that a critical unit load which has caused an active intervention for avoiding disruptions is generally uncritical because it does not cause an actual disruption (which fact, however, is the result of the active intervention for avoiding disruptions). For example, the respective unit loads can be "flagged" and excluded from the learning process. They will then be practically non-existent for the self-learning algorithm, as is also the case when reloading the articles from one loading aid into another. Here, the unit load (expected to be) causing the disruption is discarded (also physically) and therefore no longer appears in the further procedure.

It is further favorable if an operating state of the conveying system at the disruption location is detected in step e), fed into the learning algorithm in step f) and taken into account in steps b) and g) in the sense that the disruption probability of the occurrence of a disruption during the transport of the unit loads is specified depending on the unit load properties of a unit load, depending on the disruption location and depending on the operating state at the disruption location. This ensures that an operating state at a disruption location which is critical for specific classes of unit load properties, i.e. during which disruptions often occur during the transport of these unit loads, can be identified. An "operating state" of the conveying system is in particular also the result of specified operating parameters. For example, values referring to the load of the conveying system, such as "idle run," "partial-load operation" or "full-load operation," or values referring to a disruption, such as "normal operation" or "disrupted operation," may be provided. Evidently, the operating state can also have more detailed characterizing values and in particular describe a disruption in more detail. For example, the "operating state" can be characterized by or describe vibrations of a conveying means, for example if a moving component of the conveying means suffered bearing damage. For example, it would be conceivable that light unit loads drop statistically more often off a vertical lift whose guide system is no longer functioning properly and on which stronger vibrations therefore occur.

It is further advantageous if a bypassing of the predicted disruption location on the conveying system of the picking system during the transport of the unit load or a changing of an operating parameter of the conveying system at the predicted disruption location is only initiated if a disruption is probable for the operating state which is in effect at the predicted disruption location. This variant takes into account that operating states of the conveying system can change over time. In particular, this relates to repair work on the conveying system, after which the operating state may change abruptly for the better. For example, a disruption location may suddenly be uncritical for specific classes of unit load properties after a repair, whereby a rerouting of unit loads or an intervention into the operating parameters can be avoided. In particular, this variant can also be applied to the above-mentioned steps i), ii) and iii), wherein the operating state at the disruption location is taken into account there. An example would be the repair of the defective guide system of the aforementioned vertical lift, whereby excessive vibrations can be avoided in the future. Also light unit loads would then statistically no longer inadvertently drop off the vertical lift often (or no longer at all).

It is further favorable if a disruption time which elapsed from the point in time where the unit load is handed over onto the conveying system up to the occurrence of a disruption (optionally minus a time span in which the unit load was stored in a storage zone of the picking system) and/or a disruption path traveled by the unit load on the conveying system up to the occurrence of a disruption is detected (by the monitoring and classification unit) in step e), fed into the learning algorithm in step f) and taken into account in steps b) and g) in the sense that the disruption probability of the occurrence of a disruption during the transport of the unit loads is specified depending on the unit load properties of a unit load and depending on the disruption time and/or the disruption path. This helps detect whether the occurrence of disruptions becomes more probable after a specific residence time of the unit loads on the conveying system or after traveling a specific path on the conveying system and step b) should therefore advantageously be executed. The path mentioned may in particular relate to the distance traveled (only) or contain route information also. For example, disruptions are more likely if the unit load has often passed locations where there is a higher risk of changes in the unit load properties occurring. For example, the passing of infeed and outfeed units could lead to a disadvantageous deforming of the unit load.

Yet it is also favorable if steps b), e), f) and g) are executed independent of a disruption time elapsed from the point in time where the unit load is handed over onto the conveying system up to the occurrence of a disruption (optionally minus a time span in which the unit load was stored in a store of the picking system) and/or independent of a disruption path traveled by the unit load on the conveying system up to the occurrence of a disruption. Tests have shown that disruptions often occur soon after the handover of a unit load onto the conveying system of the picking system and are less probable to occur after that. In this variant, the taking into account of the disruption time and/or of the disruption path is relinquished in favor of a simplified structure of the learning algorithm.

Furthermore, it is favorable if steps a) to g) are run through multiple times for one and the same unit load. This ensures that changes in the unit load properties which occur over time are taken into account.

It is further favorable if a measure based on the probability of the occurrence of a disruption is initiated in step b) if the disruption probability is above a specifiable threshold value. In this manner, the level of sensitivity with which the picking system responds to predicted disruptions can be controlled. For example, a measure based on the disruption probability of the occurrence of a disruption can be initiated in step b) if the disruption probability is above 10%, above 20% or above a different specifiable value. In addition, it may be provided that, in order to initiate a measure based on the disruption probability in step b), the confidence (i.e. the certainty or reliability of the disruption probability issued by the learning algorithm) must be above a second threshold value. This means that it may be provided that the measure provided in step b) is only initiated if the disruption probability issued by the learning algorithm constitutes a reliable (i.e. reasonably substantiated) value.

In another advantageous variant of the method presented, it is provided that the monitoring and classification unit
- reads out the unit load properties assigned to the unit load from the data memory arranged on the unit load and transmits the properties of the unit load, together with the transport classification determined in step e), to the learning algorithm, or
- detects an identification (e.g. a QR code, barcode or RFID tag) arranged on the unit load, reads out the properties of the unit load assigned to the identification from the data memory and transmits the properties of the unit load, together with the transport classification determined in step e), to the learning algorithm.

Accordingly, the monitoring and classification unit of the picking system is configured to
- read out the unit load properties assigned to the unit load from the data memory arranged on the unit load and transmit the properties of the unit load, together with the transport classification, to the learning algorithm, or detect an identification (e.g. a QR code, barcode or RFID tag) arranged on the unit load, read out the properties of the unit load assigned to the identification from the data memory and transmit the properties of the unit load, together with the transport classification, to the learning algorithm.

The assignment of the unit load properties to a unit load can therefore be done directly by a data memory being arranged on the unit load, on which data memory the properties of the unit load determined by the unit load measurement device are stored. Yet the assignment of the unit load properties to a unit load can also be done indirectly via an identification arranged on the unit load. This means that the unit load is identified via the identification and the data recorded in the data memory for this unit load is accessed via the identification. In other words, the storage space in the data memory in which the properties of the unit load determined by the unit load measurement device are stored can be located. Data memories for unit load properties of multiple unit loads can in particular also be understood as "databases."

In another advantageous variant of the method presented, it is provided that the unit load properties assigned to the unit load are read out from the data memory arranged on the unit load by a mobile data detection unit of the monitoring and classification unit or the identification (e.g. a QR code, barcode or RFID tag) arranged on the unit load is determined by a mobile data detection unit of the monitoring and classification unit. Accordingly, the monitoring and classification unit of the picking system comprises a mobile data detection unit configured to read out the unit load properties assigned to the unit load from the data memory arranged on the unit load or detect the identification (e.g. a QR code, barcode or RFID tag) arranged on the unit load. In this embodiment variant, the monitoring and classification unit also comprises a mobile (portable) data acquisition unit (for example a tablet computer), with which the unit load causing a disruption can be identified or with which the unit load properties assigned to the unit load can be read out. Advantageously, also unit loads which are located outside of a detecting range of fixed-installation cameras, scanners and other sensors of the monitoring and classification unit can be reached in this manner.

It is further of advantage if
the picking system comprises a storage zone with storage locations for storing unit loads,
the unit load measurement device is arranged along the route of the conveying system and the conveying system connects, in terms of conveyance, the reloading station with the storage zone, and
the conveying system has a deflection device configured to transport the unit loads directly to the storage zone or to the reloading station, depending on the probability of the occurrence of a disruption.

The deflection device can be used to transport unit loads to the reloading station depending on the disruption probability. The deflection device may comprise a deflection means, for example a pusher, a roller switch, a belt offset and suchlike, which can be actuated by the control. The conveying system can comprise the deflection device.

It should be noted in this context that the variants and advantages disclosed in relation to the method presented equally relate to the picking system presented, and vice versa.

BRIEF DESCRIPTION OF THE DRAWINGS

For the purpose of better understanding of the invention, it will be elucidated in more detail by the figures below.

These show in a respectively very simplified schematic representation.

DETAILED DESCRIPTION OF THE PREFERRED EMBODIMENTS

First of all, it is to be noted that, in the different embodiments described, equal parts are provided with equal reference numbers and/or equal component designations, where the disclosures filled into in the entire description may be analogously transferred to equal parts with equal reference numbers and/or equal component designations. Moreover, the specifications of location, such as at the top, at the bottom, at the side, chosen in the description refer to the directly described and depicted figure, and in case of a change of position, are to be analogously transferred to the new position.

Figure 1:
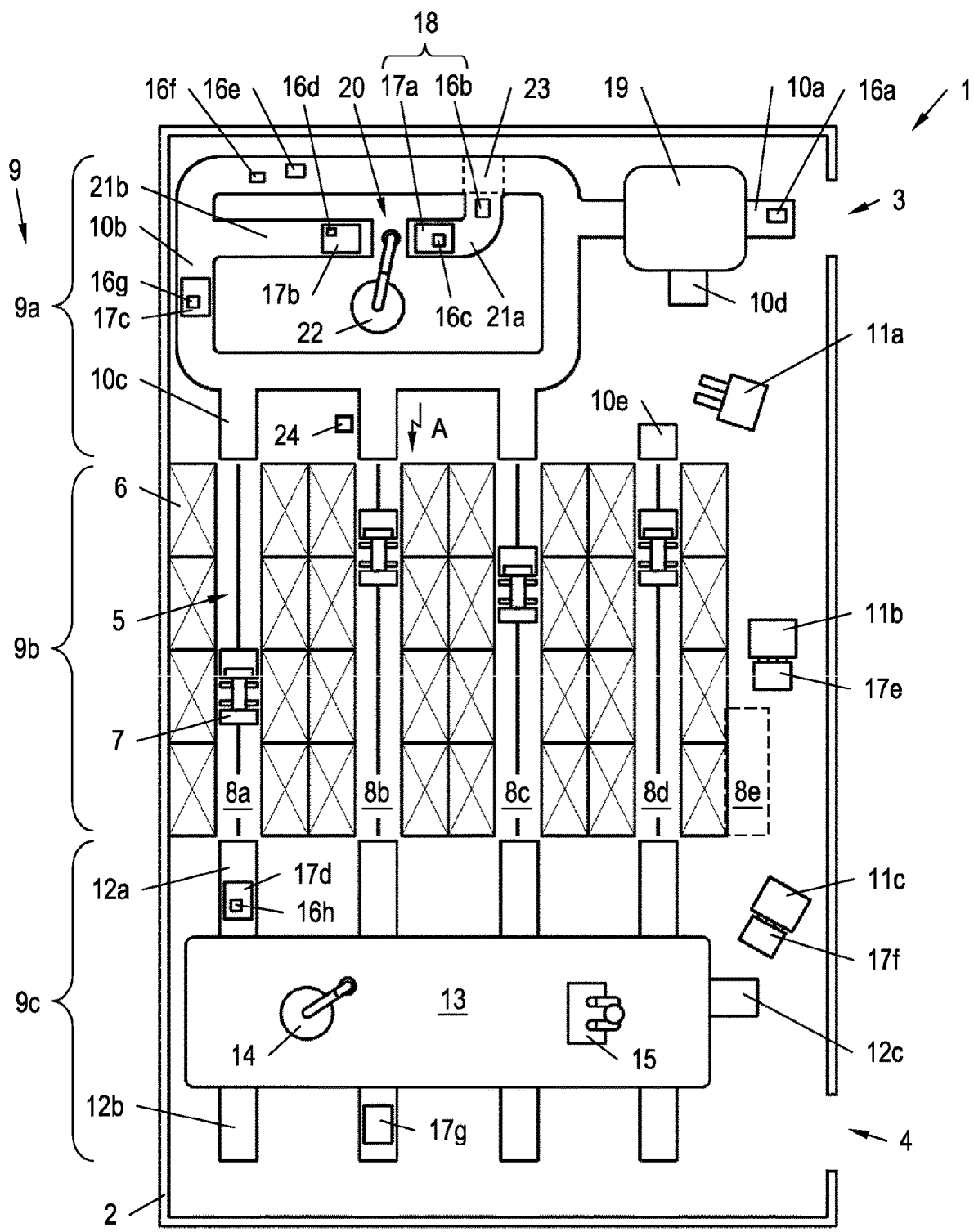
FIG. 1 an exemplary, schematically represented picking system in a top view.

FIG. 1 shows an exemplary picking system 1, which comprises a building 2 which has an article receiving area 3 as well as an article issue area 4. The picking system 1 further comprises an article warehouse 5 with storage racks 6 as well as storage and retrieval units 7 traveling between the storage racks 6. In this example, the article warehouse 5 is subdivided into multiple storage zones 8*a* . . . 8*e*. Storage racks 6 are arranged in the storage zones 8*a* . . . 8*d*, whereas the storage zone 8*e* is formed by a holding zone on the floor. Furthermore, the picking system 1 comprises a conveying system 9, which connects the article warehouse 5 with the article receiving area 3 and the article issue area 4. In this example, the conveying system 9 is divided into a storage conveying system 9*a*, a warehouse conveying system 9*b* and a retrieval conveying system 9*c*.

In this example, the storage conveying system 9*a* comprises multiple storage sections 10*a* . . . 10*e*. The first storage section 10*a* connects the article receiving area 3 with the second storage section 10*b*, which is configured annular and/or as a "loop" here. Multiple third storage sections 10*c* lead from the second storage section 10*b* to the storage and retrieval units 7 and therefore connect the second storage section 10*b* with the article warehouse 5. The fourth storage section 10*d* is connected (not visible) with the first storage section 10*a*, and the fifth storage section 10*e* is arranged in the region of the far right storage and retrieval unit 7. In addition, the first storage section 10*a*, the fourth storage section 10*d* and the fifth storage section 10*e* form transfer stations for autonomous guided vehicles 11*a* . . . 11*c*.

The warehouse conveying system 9*b* comprises essentially the storage and retrieval units 7 but may also comprise additional conveyors in the region of the article warehouse 5, such as vertical conveyors and horizontal conveyors in the region of the storage racks 6.

In this example, the retrieval conveying system 9*c* comprises three retrieval sections 12*a* . . . 12*c*. A first retrieval section 12a connects the article warehouse 5 with a picking zone 13, and a second retrieval section 12b connects the picking zone 13 with the article issue area 4. A third retrieval section 12c, once again, forms a transfer station for the autonomous guided vehicles 11a . . . 11c, which is connected with the picking zone 13 here. At the transfer stations, unit loads 18 can be handed over from the stationary conveying system onto the autonomous guided vehicles 11a . . . 11c and vice versa. The autonomous guided vehicles 11a . . . 11c can convey unit loads 18, i.e. articles 16a . . . 16h or loading aids 17a . . . 17g with articles 16a . . . 16h, between the transfer stations, i.e. between the first storage section 10a, the fourth storage section 10d, the fifth storage section 10e and the third retrieval section 12c.

The picking zone 13 is not represented in detail in FIG. 1 and comprises, in the example shown, optional automatic picking stations 14, optional manual picking stations 15 (both symbolically represented), as well as an internal conveying system 9, which is not represented.

The storage sections 10a . . . 10e, the storage and retrieval units 7 as well as the retrieval sections 12a . . . 12c form part of the stationary conveying system 9. The autonomous guided vehicles 11a . . . 11c are mobile and therefore form part of both the storage conveying system 9a and the retrieval conveying system 9c. In addition, they also form part of the warehouse conveying system 9b because they can directly access storage locations in the storage zone 8e.

In the storage racks 6 and in the storage zone 8e, articles 16a . . . 16h can be stored directly or using loading aids 17a . . . 17g. Likewise, articles 16a . . . 16h can be transported directly or using loading aids 17a . . . 17g on the conveying system 9 and using the autonomous guided vehicles 11a . . . 11c. In this case, the loading aids 17a . . . 17g may in particular be configured as trays, cardboard boxes or containers with a fixed base and side walls. Loading aids 17a . . . 17g as well as articles 16a . . . 16h which can be transported and stored without loading aids 17a . . . 17g generally form unit loads 18 within the scope of this disclosure. In FIG. 1, only the article 16a and the loading aid 17b are explicitly referred to as unit loads 18. Evidently, this assignment also applies to the remaining articles 16b . . . 16h and loading aids 17a, 17c . . . 17g.

In the region of the conveying system 9, in particular in the region of the storage conveying system, for example in the region of the first storage section 10a, there is a unit load measurement device 19 for determining unit load properties a of a unit load 18, which will be explained in more detail below.

Further, the storage conveying system 9a comprises a reloading station 20 with a supply section 21a, a reloading robot 22 and a discharge section 21b. In the region of the second storage section 10b, a deflection device 23 is arranged, with the help of which the unit loads 18 are optionally conveyed further on the "loop" or deflected into the reloading station 20. The reloading station 20 will equally be explained in more detail below.

The deflection device 23 comprises a deflection means and/or an outfeed device, for example a roller switch, a belt offset or a pusher, which is, in turn, controlled by the control 35 (as described below). The conveying system 9 can comprise the deflection device.

Finally, also a position mark 24 arranged on the conveying system 9, or at least assigned to the conveying system 9, is represented in FIG. 1. Specifically, it is located at a disruption location A, the significance of which will equally be explained in detail below.

Figure 2:
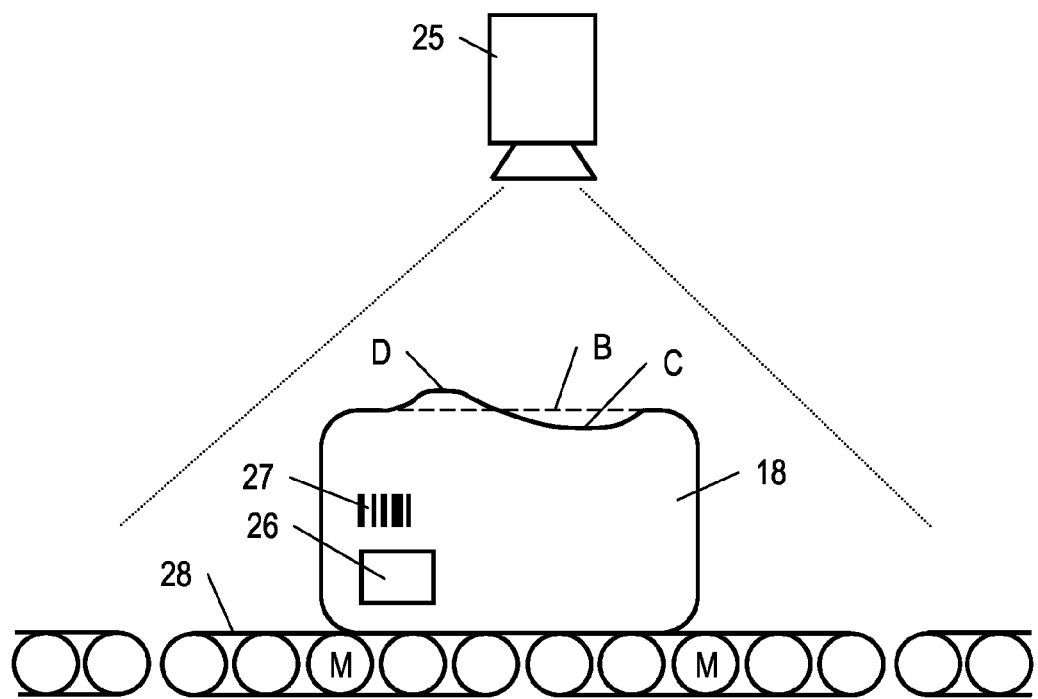
FIG. 2 a detailed side view of a schematically represented unit load measurement device.

FIG. 2 shows an exemplary unit load measurement device 19, here in detail. Specifically, it comprises a laser scanner 25 in the example shown. Yet it would also be conceivable that the unit load measurement device 19 comprises a camera (in particular a 3D camera) or other sensors for capturing unit load properties a. In the region of the unit load measurement device 19, there is a unit load 18, which, ideally, has a target shape B (in this case a cuboid shape with rounded edges). Yet, in reality, the unit load 18 also has an indentation C reaching below the target shape B as well as a bulge D protruding beyond the target shape B. Also an optional RFID tag 26 and an optional barcode 27 are arranged on the unit load 18. Further, in the region of the unit load measurement device 19, there are conveyor belts 28 of the first storage section 10a driven by motors M. Instead of conveyor belts 28, of course also the conveyor rollers may be in direct contact with the unit load 18 and drive it. In particular, multiple conveyor rollers can be interconnected via belts in order to drive them synchronously.

The indentation C or bulge D can be specified, for example, by the (maximum) normal distance of the indentation C/bulge D to the target shape B, by an area deviating from the target shape B, by a volume enclosed between indentation C/bulge D and target shape B or by a measure which is derived from one of the specified parameters or from a combination of these parameters. For example, the measure can be a (dimensionless) proportion between the area specified above and the surface of the target shape B or a (dimensionless) proportion between the volume specified above and the volume of the target shape B. The deviation of the unit load 18 from a target shape B can also contain the position of the deviation on the unit load 18, for example, "at the top," "at the bottom," "on the left," "on the right," "at the front," "at the rear."

Beside the deviation of the unit load 18 from a target shape B, also other unit load properties a of the unit load can be determined and utilized, for example the weight of the unit load 18 (the unit load measurement device 19 would then comprise a scale, unless the weight is known before the delivery to the picking system 1), dimensions (e.g. length, width, height, surface or volume) of the unit load 18 or surface quality of the unit load 18. The surface quality can in particular be a coefficient of friction of the surface of the unit load 18. Yet the surface quality can also be, for example, a moisture value of the unit load 18, in particular if this unit load has a hygroscopic surface (and the surface consists, for example, of cardboard or wood).

According to the prior art, the unit load measurement device 19, or an evaluation unit connected thereto, often performs a classification concerning the conveyance properties, for example, "not conveyable," "conveyable," "difficult to convey," "easy to convey." For the purposes of the present disclosure, these conveyance properties can equally be understood as unit load properties a, even though, strictly speaking, they describe the interaction between a unit load 18 and the conveying system 9. Such a unit load measurement device 19 can in particular be understood to be a unit load measurement device 19 already used in the art, which detects, in particular, the deviation of the unit load 18 from a target shape B and derives a conveyance property therefrom.

Figure 3:
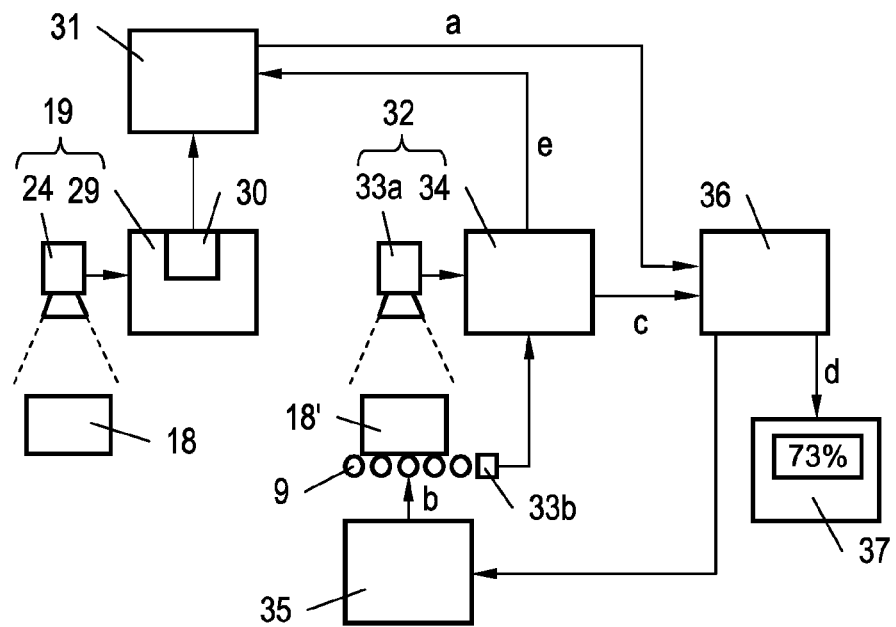
FIG. 3 a block diagram of the control and computer architecture of the picking system with particular reference to the learning phase of the learning algorithm.

FIG. 3 shows a block diagram of the control and computer architecture of the picking system 1. This comprises the unit load measurement device 19 already generally disclosed in FIGS. 1 and 2, which comprises, in this case, the laser scanner 25 as well as a measurement processing module 29 connected thereto, with the help of which the measurement operation can be controlled and the data obtained from the laser scanner 25 can be analyzed and/or evaluated. The unit load properties a determined by the laser scanner 25 and the measurement processing module 29 are written into a data memory 31 and stored there for later use using the writing device 30 of the measurement processing module 29.

Along the route of the conveying system 9, there may be a monitoring and classification unit 32 configured to detect a disruption during the transport of the unit load 18 and then classify the transport of the unit load 18 as disrupted or classify the transport as disruption-free if no disruption was detected by the monitoring and classification unit 32 during the transport of this unit load 18 within a specifiable observation period. Specifically, the monitoring and classification unit 32 comprises multiple sensors 33a, 33b and a monitoring/classification processing module 34 connected with them. In this example, the sensor 33a is specifically configured as a camera; the sensor 33b can be a current sensor, for example, which measures the motor current of the motor M. The sensors 33a, 33b detect the unit load 18' (which is the unit load 18 at a later point in time) and monitor the transport of the unit load 18' together with the monitoring/classification processing module 34.

The transport as such is controlled by the control 35, which transmits, for that purpose, operating parameters b to the conveying system 9. For example, an operating parameter b can be understood to mean rpm, or an rpm curve, of a motor M.

The unit load properties a from the data memory 31 and a transport classification c determined by the monitoring and classification unit 32 are fed into a learning algorithm 36. This learning algorithm 36 can compute a probability of the occurrence of a disruption during the transport of the unit loads 18 (in short: "disruption probability" d) from the data which are received for a plurality of unit loads 18, depending on the unit load properties a of the unit loads 18. This disruption probability d can be displayed on an output unit 37 or serve as an input parameter for the control 35.

Figure 4:
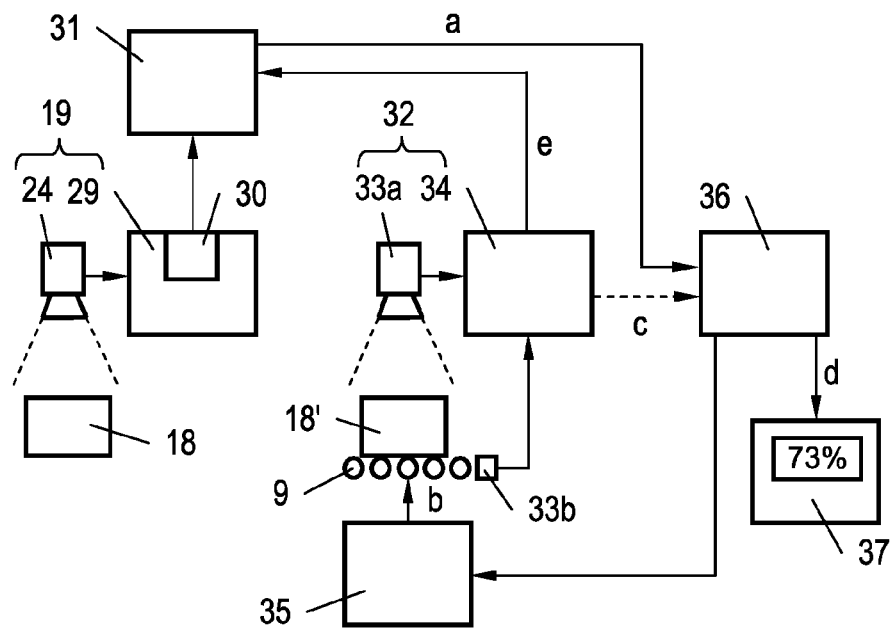
FIG. 4 a block diagram of the control and computer architecture of the picking system with particular reference to the operating phase of the learning algorithm.

FIG. 3 shows the control and computer architecture of the picking system 1 with particular reference to the learning process of the learning algorithm 36. In contrast, FIG. 4 represents in particular how the results of the learning algorithm 36 are used for the operation of the picking system 1 during the operating phase.

As soon as the unit load properties a of a unit load 18 are acquired, they are fed into the learning algorithm 36 (i.e. not only stored in the data memory 31). At that point in time, it is not known yet whether this (precise) unit load 18 will cause a disruption during the transport on the conveying system 9 because this possible event is in the future. This is why the arrow from the monitoring and classification unit 32 to the learning algorithm 36 is marked with a dashed line in FIG. 4. However, it is known from the learning phase whether unit loads 18 with the same or similar properties cause disruptions often or less often. Accordingly, the learning algorithm 36 can create a prediction for the unit load 18. This prediction in the form of the disruption probability d can be displayed on the output unit 37, or it is fed into in the control 35.

Figure 6:
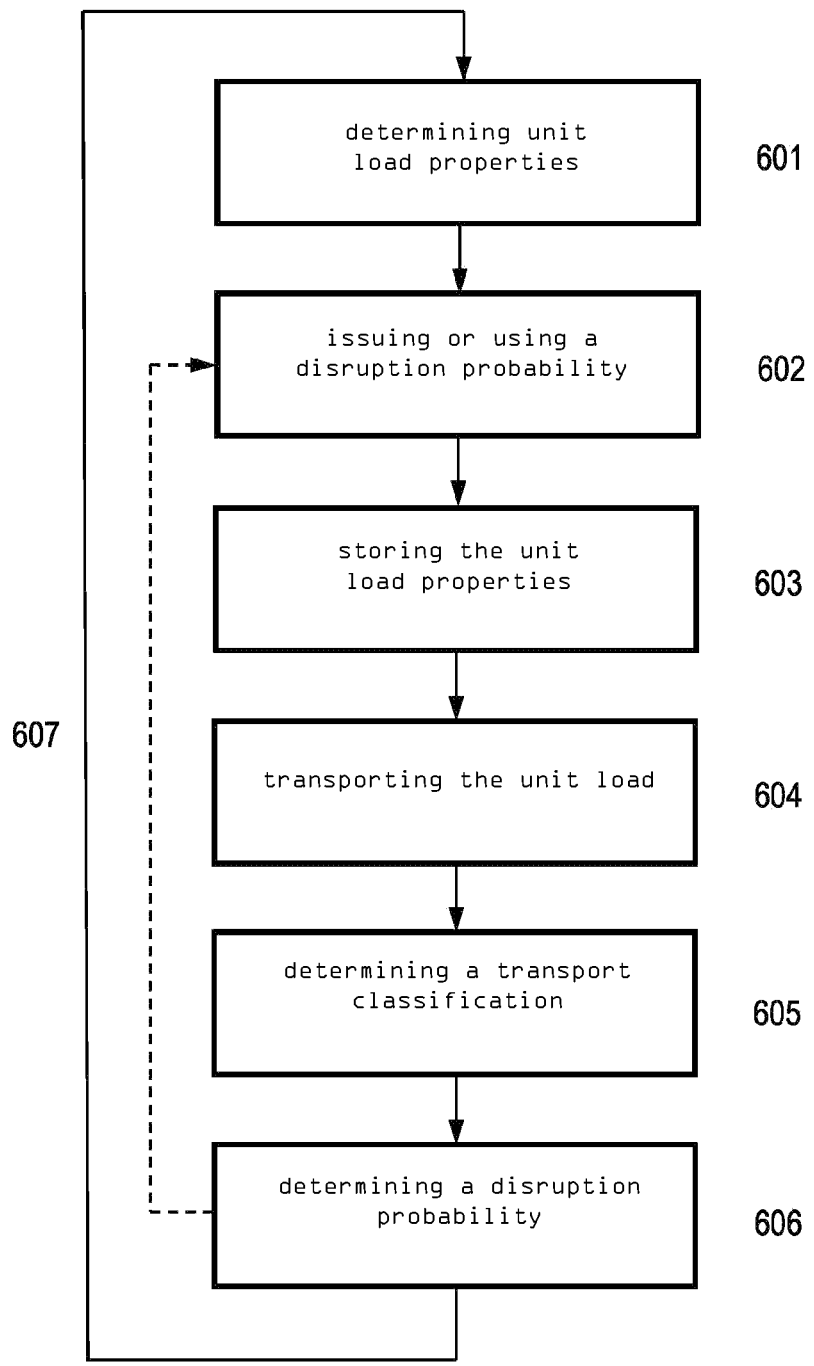
FIG. 6 an exemplary, graphic representation of a procedure of the method presented.

In summary, this results in the following procedure, which is visualized also in FIG. 6 in the form of a flow chart:
 a) determining, with a unit load measurement device 19 of the picking system 1, unit load properties a of a unit load 18 to be transported with a conveying system 9 of the picking system 1 (step 601),
 b) issuing, with an output unit 37 of the picking system 1, a disruption probability d of the occurrence of a disruption and/or initiating, with a control 35 of the picking system 1, a measure which reduces the probability of the occurrence of this disruption if the occurrence of a disruption is probable, based on the respective determined unit load properties a (step 602),
 c) storing the determined unit load properties a in a data memory 31 assigned to the unit load 18 (step 603),
 d) transporting the unit load 18 with the conveying system 9 of the picking system 1 (step 604),
 e) monitoring the transport of this unit load 18 by a monitoring and classification unit 32 of the picking system 1 and classifying the transport as disrupted if a disruption during the transport of this unit load 18 is detected by the monitoring and classification unit 32 or classifying as disruption-free the transport by the monitoring and classification unit 32 if no disruption is detected by the monitoring and classification unit 32 during the transport of this unit load 18 within a specifiable observation period (step 605),
 f) feeding the stored unit load properties a and the transport classification c of the transport of the unit load 18 determined in step e) into a learning algorithm 36 (step 606), and
 g) repeating steps a) to f) for a plurality of unit loads 18 and computing, with the learning algorithm 36, a disruption probability d of the occurrence of a disruption during the transport of the different unit loads 18 for which steps a) to f) are run through, depending on their unit load properties a (loop 607).

In particular, it is possible, in this procedure, to execute step b) only after a plurality of running throughs of steps a) and c) to f). This means that it is ensured that the operating phase is preceded by a sufficiently long learning phase. It is conceivable in particular that a learning algorithm 36 which has already run through a learning phase is installed in a picking system 1. In other words, experiences from other picking systems 1 can be used in a picking system 1. The learning phase, therefore, does not start at "zero" but at an expected behavior of the picking systems 1. An adaptation to the real conditions prevailing in picking systems 1 can therefore be done analogously more quickly. Evidently, the learning and operating phases can also run in parallel. In relation to a specific unit load 18, one then benefits from experiences which were gained during the transport of past unit loads 18 while simultaneously creating new experiences for future unit loads 18. This is indicated in FIG. 6 with the dashed arrow, which symbolizes the retroactive effect of the disruption probability d.

It should also be noted that steps 602 and 603 can also be executed in a different sequence, or simultaneously. This similarly applies to steps 604 and 605, which are equally executed simultaneously.

Figure 5:
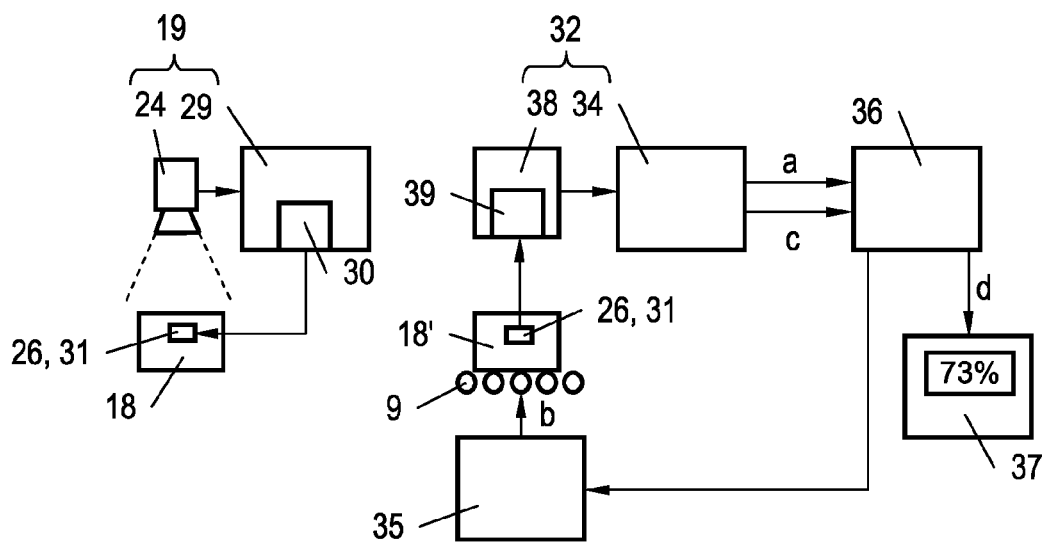
FIG. 5 a block diagram of the control and computer architecture with a mobile data detection unit.

FIG. 5 shows another variant of the control and computer architecture of the picking system 1, which is similar to the architecture shown in FIGS. 3 and 4 but differs from it with regard to the structure of the monitoring and classification unit 32 and the realization of the data memory 31. In this case, the monitoring and classification unit 32 comprises a mobile data detection unit 38 with a reading device 39, with which an RFID tag 26 and/or a barcode 27 on a unit load 18 can be read. It is in particular also conceivable that the reading device 39 is configured for reading a position mark 24, which is arranged on the conveying system 9, or at least assigned to it (see FIG. 1). This position mark 24 can equally be configured as an RFID tag or a barcode.

It is conceivable that the data memory 31 is contained in the RFID tag 26. Accordingly, it is also conceivable that the mobile data detection unit 38 detects the unit load properties a directly. This is represented in FIG. 5, from which it can also be seen that the unit load properties a are transmitted to the learning algorithm 36 by the monitoring and classification unit 32, in this case. This means that the unit load properties a assigned to the unit load 18 are read out from the data memory 31 (the RFID tag 26) arranged on the unit load 18, and the unit load properties a are transmitted to the learning algorithm 36 together with the transport classification c.

Yet it is also conceivable that the mobile data detection unit 38 detects an identification e of the unit load 18, for instance by reading the barcode 27 or the RFID tag 26, which, in this embodiment, stores merely an identification e of the unit load 18 but not its unit load properties a. In this case, also an identification e arranged on the unit load 18 is determined, the unit load properties a assigned to the identification e are read out from the data memory 31 and the unit load properties a are transmitted to the learning algorithm 36 together with the transport classification c.

It should be noted in this context that the identification e of the unit load 18 need not necessarily be determined by the mobile data detection unit 38, but a unit load 18 can also be determined by fixed-installation sensors 33a, 33b of the monitoring and classification unit 32, in particular by the camera 33a. For the sake of completeness, it should also be noted that the monitoring and classification unit 32 may comprise both fixed-installation sensors 33a, 33b and the mobile data detection unit 38.

There is therefore a number of options available for the measure for averting a disruption initiated in step b), which options will be enumerated in an exemplary and non-exhaustive manner below:

Reloading the articles 16c contained in a loading aid 17a into another loading aid 17b at a reloading station 20, or initiating such a reloading.

Taking into account, for the detection of the disruption probability d, a disruption location A at which a disruption occurs and in particular bypassing the predicted disruption location A or changing an operating parameter b of the conveying system 9 at the predicted disruption location A.

Taking into account an operating state of the conveying system 9 at the disruption location A and in particular bypassing the predicted disruption location A or changing an operating parameter b of the conveying system 9 at the predicted disruption location A if the determined operating state indicates this.

Taking into account a disruption time which has elapsed up to the occurrence of a disruption and/or a disruption path which the unit load 18 traveled up to the occurrence of a disruption. In particular, one of the above-mentioned measures can be taken automatically after the disruption time has elapsed or after traveling the disruption path, or a reevaluation of the unit load 18 by the unit load measurement device 19 can be performed.

The measure for averting a disruption initiated in step b) can in particular be initiated whenever the disruption probability d is above a specifiable threshold value. In this manner, the level of sensitivity with which the picking system 1 responds to predicted disruptions can be controlled. For example, a measure based on the disruption probability d of the occurrence of a disruption can be initiated in step b) if the disruption probability d is above 10%, above 20% or above a different specifiable value.

In detail, this means the following:

If the unit load 18 is a loading aid 17a loaded with articles 16c, the measure initiated in step b) can consist in reloading the articles 16c contained in the (source) loading aid 17a into another (target) loading aid 17b at the reloading station 20 of the picking system 1, or initiating such a reloading, and subsequently continuing with step a) or transporting the other (target) loading aid 17b on the conveying system 9 of the picking system 1 without running through steps a) to g).

This means that the articles 16c contained in the (source) loading aid 17a are reloaded into a (target) loading aid 17b for which the occurrence of a disruption is less probable. If the (target) loading aid 17b can, a priori, be classified as in order, this loading aid can be transported on the conveying system 9 of the picking system 1 without running through steps a) to g). If the proper condition of the (target) loading aid 17 cannot be assumed a priori, step a) can be carried out next. The reloading of the articles 16c from the (source) loading aid 17a onto the (target) loading aid 17b can be done manually or automatically (as in this case by the reloading robot 22) or combined manually and automatically.

This operation is easily apparent in FIG. 1. For example, in case of a disruption probability d above 20%, it may be provided that the respective unit load 18 is directed, by the deflection device 23, to the reloading station 20, where the articles 16c are reloaded as described. If the disruption probability d is below that, the unit load 18 is transported further on the second storage section 10b (the loop). The deflection device 23 is therefore configured for transporting the unit loads 18 directly to the storage zone 8a . . . 8d or to the reloading station 20, depending on the disruption probability d.

It is also conceivable that a disruption location A at which a disruption occurs is detected by the monitoring and classification unit 32 in step e), fed into the learning algorithm 36 in step f) and taken into account in steps b) and g) in the sense that the disruption probability d of the occurrence of a disruption during the transport of the unit loads 18 is specified depending on the unit load properties a of a unit load 18 and depending on the disruption location A. This ensures that locations in the picking system 1 which are critical for specific classes of unit load properties a, i.e. at which disruptions often occur during the transport of these unit loads 18, can be identified.

The measure initiated in step b) can in particular consist in transporting the unit load 18 on the conveying system 9 of the picking system 1 whilst bypassing the predicted disruption location A, in particular if, or only if, a disruption probability d is smaller as a result of bypassing the predicted disruption location A. This option presents itself in particular if multiple transport paths are optionally available for the unit load 18 inside the picking system 1. For example, it may be provided to store the unit load 18 in the storage zone 8a, 8c, 8d, 8e in which disruptions during the storage operation (and optionally also during the retrieval operation) are less, or least, probable. This means that a storing in the storage zone 8b is avoided because of the predicted disruption. It may also be provided that the unit load 18 is transported to a specific destination via the transport route for which disruptions during the transport are less, or least, probable. For example, the respective unit load 18 can be transported with an autonomous guided vehicle 11a . . . 11c if there is danger of a disruption in case of a transport on the stationary conveying system. It is also conceivable that a picking operation in the picking zone 13 during which the unit load 18 functions as a source loading aid 17d is done at the manual picking station 15 if a disruption is probable for an alternative automatic picking operation at the automatic picking station 14, and vice versa.

The two above-mentioned variants can also be combined. Provided that the unit load 18 is a loading aid 17a loaded with articles 16c, the measure initiated in step b) may consist in i) transporting the unit load 18 on the conveying system 9 of the picking system 1 whilst bypassing the predicted disruption location A if this is possible, or ii) reloading the articles 16c contained in the loading aid 17a into another loading aid 17b at the reloading station 20 of the picking system 1 and subsequently continuing with step a) or transporting the other loading aid 17b on the conveying system 9 of the picking system 1 without running through steps a) to g) if step i) is not possible.

In this variant, a (time-consuming) reloading operation is avoided where possible, namely whenever a predicted disruption can be averted by transporting the unit load 18 on the conveying system 9 of the picking system 1 whilst bypassing the predicted disruption location A. Optionally, step ii) can be executed even if, while step i) is generally possible, the reduction of the disruption probability d achievable with it is small, in particular smaller than the reduction of the disruption probability d achievable by step ii).

It would also be conceivable that the measure initiated in step b) consists in changing an operating parameter b of the conveying system 9 at the predicted disruption location A, in particular if, or only if, a disruption probability d is lower when changing the operating parameter b at the predicted disruption location A. This option presents itself in particular whenever adjustable operating parameters b for the conveying system 9 are available at the predicted disruption location A. An operating parameter b is a control variable for influencing the operation of the conveying system 9 which is adjustable for the conveying system 9. An operating parameter b can be understood to mean, for example, a conveyance speed on the conveying system 9 and/or an acceleration on the conveying system 9. For example, it would be conceivable to reduce a conveyance speed and/or an acceleration during the conveyance of the unit load 18 at the predicted disruption location A.

It would be conceivable, once again, to execute only a conditional reloading of articles 16c. If the unit load 18 is a loading aid 17a loaded with articles 16c, for example, the measure initiated in step b) may consist in i) changing an operating parameter b of the conveying system 9 at the predicted disruption location A if this is possible or ii) reloading the articles 16c contained in the loading aid 17a into another loading aid 17b (at the reloading station 20 of the picking system 1) and subsequently continuing with step a) or transporting the other loading aid 17b on the conveying system 9 of the picking system 1 without running through steps a) to g) if step i) is not possible.

In this variant, a (time-consuming) reloading operation is equally avoided where possible, namely whenever a predicted disruption can be averted by changing an operating parameter b of the conveying system 9 at the predicted disruption location A. Optionally, step ii) can be executed even if, while step i) is generally possible, the reduction of the disruption probability d achievable with it is small, in particular smaller than the reduction of the disruption probability d achievable by step ii).

Further conceivable would be a combination of the variants for averting a disruption presented so far. Provided that the unit load 18 is a loading aid 17a loaded with articles 16c, the measure initiated in step b) may consist in i) transporting the unit load 18 on the conveying system 9 of the picking system 1 whilst bypassing the predicted disruption location A if this is possible, or ii) changing an operating parameter b of the conveying system 9 at the predicted disruption location A if this is possible, or iii) reloading the articles 16c contained in the loading aid 17a into another loading aid 17b at the reloading station 20 of the picking system 1 and subsequently continuing with step a) or transporting the other loading aid 17b on the conveying system 9 of the picking system 1 without running through steps a) to g) if step i) or step ii) is not possible.

In this variant, a (time-consuming) reloading operation is avoided, once again, where possible, namely whenever a predicted disruption can be averted by transporting the unit load 18 on the conveying system 9 of the picking system 1 whilst bypassing the predicted disruption location A or by changing an operating parameter b of the conveying system 9 at the predicted disruption location A. Optionally, step iii) can be executed even if, while step i) or step ii) is generally possible, the reduction of the disruption probability d achievable with it is small, in particular smaller than the reduction of the disruption probability d achievable by step iii). For steps i) and ii), a fixed prioritization (i.e. execute step ii) only if step i) is not possible or vice versa) or a prioritization according to the achievable reduction of the disruption probability d (i.e. execute the step out of steps i) or ii) for which the largest reduction of the disruption probability d is achievable) can be done.

It is advantageous if step f) is skipped for those unit loads 18 for which the measure initiated in step b) consists in transporting the unit load 18 on the conveying system 9 of the picking system 1 whilst bypassing the predicted disruption location A or for which the measure initiated in step b) consists in changing an operating parameter b of the conveying system 9 at the predicted disruption location A. This prevents the self-learning algorithm 36 from wrongly assuming that a critical unit load 18 which has caused an active intervention for avoiding disruptions is generally uncritical because it does not cause an actual disruption (which fact, however, is the result of the active intervention for avoiding disruptions). For example, the respective unit loads 18 can be "flagged" and excluded from the learning process. They will then be practically non-existent for the self-learning algorithm 36, as is also the case when reloading the articles 16c from one loading aid 17a into another loading aid 17b. In this case, the unit load 18 (expected to be) causing the disruption is discarded (also physically) and therefore no longer appears in the further procedure. In addition to step f), also step e) can be skipped.

It is further conceivable that an operating state of the conveying system 9 at the disruption location A is detected in step e), fed into the learning algorithm 36 in step f) and taken into account in steps b) and g) in the sense that the disruption probability d of the occurrence of a disruption during the transport of the unit loads 18 is specified depending on the unit load properties a of a unit load 18, depending on the disruption location A and depending on the operating state at the disruption location A. This ensures that an operating state at a disruption location A which is critical for specific classes of unit load properties a, i.e. during which disruptions often occur during the transport of these unit loads 18, can be identified. An "operating state" of the conveying system 9 is in particular also the result of specified operating parameters b. For example, values referring to the load of the conveying system 9, such as "idle run," "partial-load operation" or "full-load operation," or values referring to a disruption, such as "normal operation" or "disrupted operation," may be provided. Evidently, the operating state can also have more detailed characterizing values and in particular describe a disruption in more detail. For example, the "operating state" can be characterized by or describe vibrations of a conveying means, for example if a rotating part of the conveying means suffered bearing damage. For example, it would be conceivable that light unit loads 18 drop statistically more often off a vertical lift whose guide system is no longer functioning properly and on which stronger vibrations therefore occur.

It may in particular be provided that a bypassing of the predicted disruption location A on the conveying system 9 of the picking system 1 during the transport of the unit load 18 or a changing of an operating parameter b of the conveying system 9 at the predicted disruption location A is only initiated if a disruption is probable for the operating state which is in effect at the predicted disruption location A. This variant takes into account that operating state of the conveying system 9 can change over time. In particular, this relates to repair work on the conveying system 9, after which the operating state may change abruptly for the better. For example, a disruption location A may suddenly be uncritical for specific classes of unit load properties a after a repair, whereby an unnecessary rerouting of unit loads 18 or an unnecessary intervention into the operating parameters b can be avoided. In particular, this variant can also be applied to steps i), ii) and iii) of the above-mentioned embodiments, wherein the operating state at the disruption location A is taken into account here. An example would be the repair of the defective guide system of the aforementioned vertical lift, whereby excessive vibrations can be avoided in the future. Also light unit loads 18 would then statistically no longer inadvertently drop off the vertical lift often (or no longer at all).

In another embodiment variant, a disruption time which elapsed from the point in time where the unit load 18 is handed over onto the conveying system 9 (at the article receiving area 3) up to the occurrence of a disruption at the disruption location A and/or a disruption path traveled by the unit load 18 on the conveying system 9 up to the occurrence of a disruption is detected by the monitoring and classification unit 32 in step e), fed into the learning algorithm 36 in step f) and taken into account in steps b) and g) in the sense that the disruption probability d of the occurrence of a disruption during the transport of the unit loads 18 is specified depending on the unit load properties a of a unit load 18 and depending on the disruption time and/or the disruption path. This helps detect whether the occurrence of disruptions becomes more probable after a specific residence time of the unit loads 18 on the conveying system 9 or after traveling a specific path on the conveying system 9 and step b) should therefore advantageously be executed. The path mentioned may in particular relate to the distance traveled (only) or contain route information also. For example, disruptions are more likely if the unit load 18 has often passed locations where there is a higher risk of changes in the unit load properties a occurring. For example, the passing of infeed and outfeed units could lead to a disadvantageous deforming of the unit load 18. A time span in which the unit load 18 was stored in the store 5 can be taken into account in the above considerations (i.e. in the simplest case be deducted from the time elapsed between the handover of the unit load 18 onto the conveying system 9 up to the occurrence of a disruption), as a substantial change in the unit load properties a is not expected in case of mere storing. In particular, this relates to a deformation of a unit load 18.

Generally, steps a) to g) can be run through multiple times for one and the same unit load 18. This ensures that changes in the unit load properties a which occur over time are taken into account. This applies in particular in the above context of the disruption time and the disruption path. In that context, it may be provided to run through step a) again as an alternative to executing step b), i.e. to detect the unit load properties a again.

It should be noted in this context that, in the structure represented in FIG. 1, a repeated detection of the unit load properties a is basically only possible with the support of the autonomous guided vehicles 11a . . . 11c, or by reversing the first storage section 10a. The arrangement of the unit load measurement device 19 at the site represented in FIG. 1 is not mandatory, however, but the unit load measurement device 19 can also be arranged at a different site, for example in the second storage section 10b. It is also conceivable that multiple unit load measurement device 19 are provided along the route of the conveying system 9, in particular in the region of the retrieval conveying system 9c.

Further, it should also be noted in this context that there may be conveyors (not represented in FIG. 1) from the retrieval side to the storage side in the picking system 1, on which conveyors loading aids 17a . . . 17g which are no longer needed after the picking operation, for example, can be transported to the storage side. Also the autonomous guided vehicles 11a . . . 11c can be used for this purpose, of course. Accordingly, one and the same loading aid 17a . . . 17g can circulate in the picking system 1 for a relatively long time.

Finally, it is also conceivable that steps b), e), f) and g) are executed independent of a disruption time elapsed from the point in time where the unit load 18 is handed over onto the conveying system 9 up to the occurrence of a disruption and/or independent of a disruption path traveled by the unit load 18 on the conveying system 9 up to the occurrence of a disruption. Tests have shown that disruptions often occur soon after the handover of a unit load 18 onto the conveying system 9 (in this case at the article receiving area 3) and are less probable to occur after that. In this variant, the taking into account of the disruption time and/or of the disruption path is relinquished in favor of a simplified structure of the learning algorithm 36.

In summary, the proposed measures ensure that disruptions which are caused by a unit load 18 on the conveying system 9 of the picking system 1 are attributed and/or assigned to its unit load properties a. Collecting the respective information for a plurality of unit loads 18 enables a "pattern" for the occurrence of disruptions to be identified (provided that such a pattern exists). As soon as this knowledge from experience has been gathered, disruptions can be predicted and a probability d of their occurrence can be determined and displayed. Counter-measures can further be initiated in order to avoid the actual occurrence of the predicted disruption. In this manner, in particular negative influences on the picking system 1 by specific unit loads 18 which were not or could not be taken into account during the planning stage of the picking system 1 can be identified retrospectively.

Finally, it should be noted that the scope of protection is determined by the claims. However, the description and the drawings are to be adduced for construing the claims. Individual features or feature combinations from the different exemplary embodiments shown and described may represent independent inventive solutions. The object underlying the independent inventive solutions may be gathered from the description.

In particular, it should also be noted that, in reality, the depicted devices can also comprise more, or also fewer, components than depicted. In some cases, the shown devices and/or their components may not be depicted to scale and/or be enlarged and/or reduced in size.

| List of reference numbers | |
|---|---|
| 1 | picking system |
| 2 | building |
| 3 | article receiving area |
| 4 | article issue area |
| 5 | article warehouse |
| 6 | storage rack |
| 7 | storage and retrieval unit |
| 8a . . . 8e | storage zone |
| 9 | conveying system |
| 9a | storage conveying system |
| 9b | warehouse conveying system |
| 9c | retrieval conveying system |
| 10a . . . 10e | storage section |
| 11a . . . 11c | autonomous guided vehicle |
| 12a . . . 12c | retrieval section |
| 13 | picking zone |
| 14 | automatic picking stations |
| 15 | manual picking stations |
| 16a . . . 16h | article(s) |
| 17a . . . 17g | loading aids |
| 18 | unit load |
| 19 | unit load measurement device |
| 20 | reloading station |
| 21a | supply section |
| 21b | discharge section |
| 22 | reloading robot |
| 23 | deflection device |
| 24 | position mark |
| 25 | laser scanner |
| 26 | RFID tag |
| 27 | barcode |
| 28 | conveyor belt |
| 29 | measurement processing module |
| 30 | writing device |
| 31 | data memory |
| 32 | monitoring and classification unit |
| 33a, 33b | sensor |
| 34 | monitoring/classification processing module |
| 35 | control |
| 36 | learning algorithm |
| 37 | output unit |
| 38 | mobile data detection unit |
| 39 | reading device |
| a | property of unit loads |
| b | operating parameter |
| c | transport classification |
| d | disruption probability |
| e | identification |
| A | disruption location |
| B | target shape |
| C | indentation |
| D | bulge |
| M | motor |

The invention claimed is:

1. A method for predicting and/or averting a future disruption in a picking system, comprising the steps:
a) determining, with a unit load measurement device of the picking system, unit load properties of a unit load to be transported with a conveying system of the picking system,
b) issuing, with an output unit of the picking system, a probability of the occurrence of a disruption based on the determined unit load properties and/or initiating, with a control of the picking system, a measure which reduces the probability of the occurrence of this disruption if the occurrence of a disruption is probable, based on the determined unit load properties,
c) storing the determined unit load properties in a data store memory assigned to the unit load,
d) transporting the unit load with the conveying system of the picking system,
e) monitoring the transport of this unit load by means of a monitoring and classification unit of the picking system and classifying the transport as disrupted if a disruption is detected by the monitoring and classification unit during the transport of this unit load or classifying the transport as disruption-free if no disruption is detected by the monitoring and classification unit during the transport of this unit load within a specifiable observation period,
f) feeding the stored unit load properties and the transport classification of the transport of the unit load determined in step e) into a learning algorithm, and
g) repeating steps a) to f) for a plurality of unit loads and computing, with the learning algorithm, a probability of the occurrence of a disruption during the transport of the various unit loads for which steps a) to f) are run through, depending on their unit load properties.

2. The method according to claim 1, wherein step b) is only executed after a plurality of running throughs of steps a) and c) to f).

3. The method according to claim 1, wherein the unit load is a loading aid loaded with articles and the measure initiated in step b) comprises reloading the articles contained in the loading aid into another loading aid, or initiating such a reloading, and subsequently continuing with step a) or transporting the other loading aid on the conveying system of the picking system without running through steps a) to g).

4. The method according to claim 1, wherein a disruption location at which a disruption occurs is detected in step e), fed into the learning algorithm in step f) and taken into account in steps b) and g) in the sense that the disruption probability of the occurrence of a disruption during the transport of the unit loads is specified depending on the unit load properties of a unit load and depending on the disruption location.

5. The method according to claim 4, wherein the measure initiated in step b) comprises transporting the unit load on the conveying system of the picking system whilst bypassing the predicted disruption location.

6. The method according to claim 5, wherein the unit load is a loading aid loaded with articles and the measure initiated in step b) comprises
i) transporting the unit load on the conveying system of the picking system whilst bypassing the predicted disruption location if this is possible or
ii) reloading the articles contained in the loading aid into another loading aid and subsequently continuing with step a) or transporting the other loading aid on the conveying system of the picking system without running through steps a) to g) if step i) is not possible.

7. The method according to claim 6, wherein the unit load is a loading aid loaded with articles and the measure initiated in step b) comprises
i) transporting the unit load on the conveying system of the picking system whilst bypassing the predicted disruption location if this is possible, or
ii) changing an operating parameter of the conveying system at the predicted disruption location if this is possible, or iii) reloading the articles contained in the loading aid into another loading aid and subsequently continuing with step a) or transporting the other loading aid on the conveying system of the picking system without running through steps a) to g) if step i) is not possible.

8. The method according to claim 5, wherein step f) is skipped for those unit loads for which the measure initiated in step b) comprises transporting the unit load on the conveying system of the picking system whilst bypassing the predicted disruption location or for which the measure initiated in step b) comprises changing an operating parameter of the conveying system at the predicted disruption location.

9. The method according to claim 4, wherein the measure initiated in step b) comprises changing an operating parameter (b) of the conveying system at the predicted disruption location.

10. The method according to claim 9, wherein the unit load is a loading aid loaded with articles and the measure initiated in step b) comprises
   i) changing an operating parameter (b) of the conveying system at the predicted disruption location if this is possible, or
   ii) reloading the articles contained in the loading aid into another loading aid and subsequently continuing with step a) or transporting the other loading aid on the conveying system of the picking system without running through steps a) to g) if step i) is not possible.

11. The method according to claim 1, wherein an operating state of the conveying system at a disruption location at which a disruption occurs is detected in step e), fed into the learning algorithm in step f) and taken into account in steps b) and g) in the sense that the disruption probability of the occurrence of a disruption during the transport of the unit loads is specified depending on the unit load properties of a unit load, depending on the disruption location and depending on the operating state at the disruption location.

12. The method according to claim 11, wherein a bypassing of the predicted disruption location on the conveying system of the picking system during the transport of the unit load or a changing of an operating parameter of the conveying system at the predicted disruption location is only initiated if a disruption is probable for the operating state which is in effect at the predicted disruption location.

13. The method according to claim 1, wherein a disruption time which elapsed from the point in time where the unit load is handed over onto the conveying system up to the occurrence of a disruption and/or a disruption path traveled by the unit load on the conveying system up to the occurrence of a disruption is detected in step e), fed into the learning algorithm in step f) and taken into account in steps b) and g) in the sense that the disruption probability of the occurrence of a disruption during the transport of the unit loads is specified depending on the unit load properties of a unit load and depending on the disruption time and/or the disruption path.

14. The method according to claim 1, wherein steps b), e), f) and g) are executed independent of a disruption time elapsed from the point in time where the unit load is handed over onto the conveying system up to the occurrence of a disruption and/or independent of a disruption path traveled by the unit load on the conveying system up to the occurrence of a disruption.

15. The method according to claim 1, wherein the unit load properties are one or multiple properties from the group: weight of the unit load, dimensions of the unit load, deviation of the unit load from a target shape, surface quality of the unit load.

16. The method according to claim 1, wherein steps a) to g) are run through multiple times for one and the same unit load.

17. The method according to claim 1, wherein a measure based on the probability of the occurrence of a disruption is initiated in step b) if the disruption probability is above a specifiable threshold value.

18. The method according to claim 1, wherein the monitoring and classification unit
   reads out the unit load properties assigned to the unit load from the data memory arranged on the unit load and transmits the unit load properties, together with the transport classification determined in step e), to the learning algorithm, or
   detects an identification arranged on the unit load, reads out the unit load properties assigned to the identification from the data memory and transmits the unit load properties, together with the transport classification determined in step e), to the learning algorithm.

19. The method according to claim 18, wherein the unit load properties assigned to the unit load are read out from the data memory arranged on the unit load by a mobile data detection unit of the monitoring and classification unit or the identification arranged on the unit load is determined by a mobile data detection unit of the monitoring and classification unit.

20. A picking system, comprising
   a conveying system for transporting a unit load,
   a unit load measurement device for determining unit load properties,
   a writing device for storing the unit load properties in a data memory assigned to the unit load and a reading device for reading out the unit load properties from the data memory or a combined writing and reading device for storing the unit load properties in a data memory assigned to the unit load and for reading out the unit load properties from the data memory,
   an output unit for issuing a probability of the occurrence of a disruption and/or a control for initiating a measure which reduces the probability of the occurrence of this disruption if the occurrence of a disruption is probable, based on the respective determined unit load properties,
   a monitoring and classification unit configured to detect a disruption during the transport of the unit load and to classify the transport of the unit load as disrupted or to classify the transport as disruption-free if no disruption was detected by the monitoring and classification unit during the transport of this unit load within a specifiable observation period, and
   a learning algorithm, into which stored unit load properties and a transport classification of the transport of the unit load can be fed and which is configured to compute a probability of the occurrence of a disruption during the transport of various unit loads, depending on their unit load properties.

21. The picking system according to claim 20, comprising a data memory assigned to the unit load for storing the determined unit load properties.

22. The picking system according to claim 20, wherein the monitoring and classification unit is configured to
   read out the unit load properties assigned to the unit load from the data memory arranged on the unit load and transmit the unit load properties, together with the transport classification, to the learning algorithm, or detect an identification arranged on the unit load, read out the unit load properties assigned to the identification from the data memory and transmit the unit load properties, together with the transport classification, to the learning algorithm.

23. The picking system according to claim 22, comprising a mobile data detection unit of the monitoring and classification unit configured to read out the unit load properties assigned to the unit load from the data memory arranged on the unit load or detect the identification arranged on the unit load.

24. The picking system according to claim 20, wherein the unit load is a loading aid loaded with articles and the picking system comprises a reloading station for reloading articles from a loading aid into another loading aid.

25. The picking system according to claim 24, wherein
the picking system comprises a storage zone with storage locations for storing unit loads,
the unit load measurement device is arranged along the route of the conveying system and the conveying system connects the reloading station with the storage zone, and
the conveying system comprises a deflection device, configured to transport the unit loads directly to the storage zone or to the reloading station, depending on the probability of the occurrence of a disruption.

* * * * *

UNITED STATES PATENT AND TRADEMARK OFFICE
CERTIFICATE OF CORRECTION

PATENT NO. : 12,397,992 B2
APPLICATION NO. : 17/783296
DATED : August 26, 2025
INVENTOR(S) : Markus Gaggl Page 1 of 1

It is certified that error appears in the above-identified patent and that said Letters Patent is hereby corrected as shown below:

In the Claims

In Claim 1, Line 18 (Column 24, Line 8): please delete "means of"

Signed and Sealed this
Twenty-third Day of September, 2025

John A. Squires
*Director of the United States Patent and Trademark Office*